(12) United States Patent
Abu-Saymeh et al.

(10) Patent No.: US 11,589,701 B1
(45) Date of Patent: Feb. 28, 2023

(54) HOT BEVERAGE DISPENSING MOBILE AIRCRAFT GALLEY CART

(71) Applicant: B/E Aerospace, Inc., Winston Salem, NC (US)

(72) Inventors: Mudar S. Abu-Saymeh, Olathe, KS (US); Bryan N. Rogers, Kearney, MO (US); Sebastien A. Ramus, Olathe, KS (US); Keith R. DeBald, Gardner, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 789 days.

(21) Appl. No.: 16/534,306

(22) Filed: Aug. 7, 2019

Related U.S. Application Data

(63) Continuation-in-part of application No. 29/595,097, filed on Feb. 24, 2017, now abandoned.

(51) Int. Cl.
| | | |
|---|---|---|
| *A47J 31/00* | (2006.01) | |
| *A47B 31/06* | (2006.01) | |
| *B64D 11/00* | (2006.01) | |
| *A47B 31/02* | (2006.01) | |
| *A47B 31/00* | (2006.01) | |

(52) U.S. Cl.
CPC ............ *A47J 31/005* (2013.01); *A47B 31/02* (2013.01); *A47B 31/06* (2013.01); *B64D 11/0007* (2013.01); *A47B 2031/002* (2013.01)

(58) Field of Classification Search
CPC ...... A47J 31/005; A47B 31/00; A47B 31/002; A47B 31/02; A47B 31/06; A47B 2031/023; B64D 11/0007; B64D 11/04; B62B 2202/67
See application file for complete search history.

(56) References Cited

U.S. PATENT DOCUMENTS

| | | | | |
|---|---|---|---|---|
| 3,517,899 | A | * | 6/1970 | Vernon ................. B30B 9/3021 186/40 |
| D235,009 | S | | 4/1975 | Thompson |
| D340,336 | S | | 10/1993 | Groenewege et al. |
| D603,207 | S | | 11/2009 | Metz et al. |
| D661,043 | S | | 5/2012 | Brands |
| D682,599 | S | | 5/2013 | Bolzicco et al. |
| 9,114,748 | B1 | * | 8/2015 | Blatstein .................. B60P 1/36 |

(Continued)

FOREIGN PATENT DOCUMENTS

WO     WO-2011124192 A1 * 10/2011 ............. A47B 31/02

OTHER PUBLICATIONS

SkyTender Solution at the Aircraft Interiors Expo in Apr. 2-3, 2019 (Hamburg, Germany).

*Primary Examiner* — Jose V Chen
(74) *Attorney, Agent, or Firm* — Suiter Swantz pc llo

(57) ABSTRACT

A hot beverage dispensing mobile aircraft galley cart, a system, and a method. The hot beverage dispensing mobile aircraft galley cart may include a hot beverage maker module including a hot beverage maker. The hot beverage maker module may be implemented in or on the mobile aircraft galley cart. The hot beverage maker module may be configured to prepare and dispense a hot beverage. The hot beverage dispensing mobile aircraft galley cart may include a power module configured to provide power to the hot beverage maker module. The power module may be implemented in the mobile aircraft galley cart.

20 Claims, 17 Drawing Sheets

(56) References Cited

U.S. PATENT DOCUMENTS

| | | | |
|---|---|---|---|
| D771,992 S | 11/2016 | Yang | |
| 9,623,887 B1* | 4/2017 | Brassard | B62B 5/0006 |
| 9,770,100 B2 | 9/2017 | Huang et al. | |
| D853,169 S | 7/2019 | Choi | |
| D888,486 S | 6/2020 | Yang et al. | |
| 10,729,277 B2 | 8/2020 | Jacobs | |
| D901,225 S | 11/2020 | Remo | |
| 2008/0120187 A1* | 5/2008 | Wesley | G06Q 50/12 705/15 |
| 2008/0129159 A1* | 6/2008 | Johnson | B64D 11/04 312/111 |
| 2010/0140398 A1* | 6/2010 | Cunningham | A47J 39/006 99/290 |
| 2010/0140890 A1 | 6/2010 | Boivin et al. | |
| 2014/0021690 A1 | 1/2014 | Burd | |
| 2015/0041100 A1* | 2/2015 | Huang | A47B 31/02 219/214 |
| 2015/0059363 A1* | 3/2015 | Burd | B62B 5/0447 62/3.62 |
| 2017/0050733 A1 | 2/2017 | Miron et al. | |
| 2019/0062047 A1* | 2/2019 | Spille | B65F 1/1473 |
| 2020/0122836 A1* | 4/2020 | Carmona-Puga | B64D 11/04 |
| 2021/0276855 A1* | 9/2021 | Arora | B62B 5/0026 |

\* cited by examiner

US 11,589,701 B1

HOT BEVERAGE DISPENSING MOBILE AIRCRAFT GALLEY CART

CROSS-REFERENCE TO RELATED APPLICATIONS

The present application claims the benefit of U.S. application Ser. No. 29/595,097, filed Feb. 24, 2017. U.S. application Ser. No. 29/595,097 is herein incorporated by reference in its entirety.

BACKGROUND

Existing aircraft beverage makers are fixed galley inserts, where the beverage is prepared at the galley, in bulk quantities, and delivered to the passenger when requested. Existing aircraft beverage makers lack the ability for a personalized offering prepared in view of a passenger and delivered hot for optimum taste.

SUMMARY

In one aspect, embodiments of the inventive concepts disclosed herein are directed to a hot beverage dispensing mobile aircraft galley cart. The hot beverage dispensing mobile aircraft galley cart may include a hot beverage maker module including a hot beverage maker. The hot beverage maker module may be implemented in or on the mobile aircraft galley cart. The hot beverage maker module may be configured to prepare and dispense a hot beverage. The hot beverage dispensing mobile aircraft galley cart may include a power module configured to provide power to the hot beverage maker module. The power module may be implemented in the mobile aircraft galley cart.

In a further aspect, embodiments of the inventive concepts disclosed herein are directed to an aircraft. The aircraft may include a hot beverage dispensing mobile aircraft galley cart. The hot beverage dispensing mobile aircraft galley cart may include a hot beverage maker module including a hot beverage maker. The hot beverage maker module may be implemented in or on the mobile aircraft galley cart. The hot beverage maker module may be configured to prepare and dispense a hot beverage. The hot beverage dispensing mobile aircraft galley cart may include a power module configured to provide power to the hot beverage maker module. The power module may be implemented in the mobile aircraft galley cart.

In a further aspect, embodiments of the inventive concepts disclosed herein are directed to a method. The method may include installing a hot beverage maker module in or on a mobile aircraft galley cart, the hot beverage maker module including a hot beverage maker, the hot beverage maker module configured to prepare and dispense a hot beverage. The method may also include installing a power module in or on the mobile aircraft galley cart below the hot beverage maker module, the power module configured to provide power at least to the hot beverage maker module.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
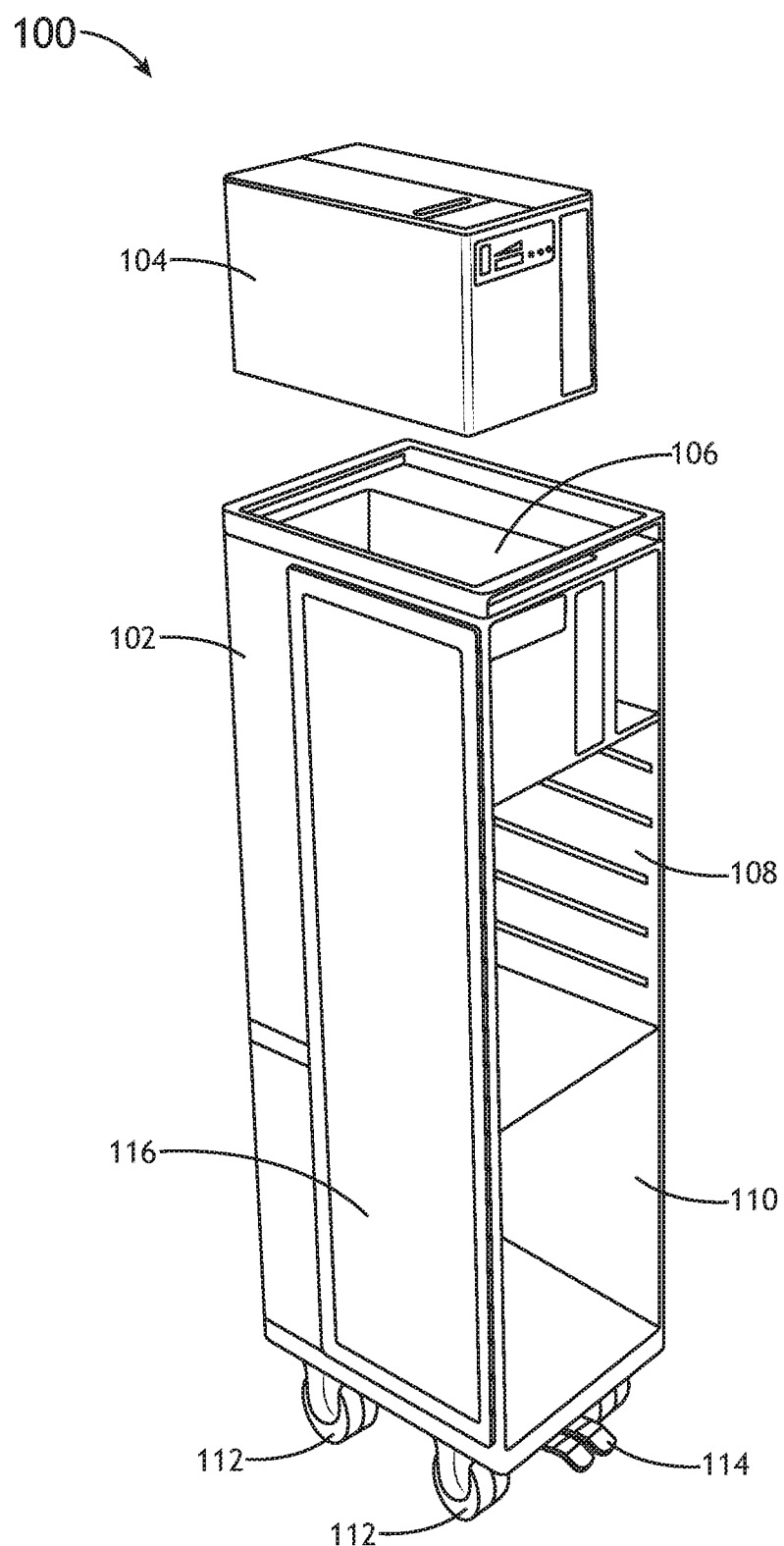
FIG. 1 is a view of an exemplary embodiment of a hot beverage dispensing mobile aircraft galley cart implemented in an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system, method, and a hot beverage dispensing mobile aircraft galley cart, which may include a hot beverage maker module and a power module. Some embodiments allow for a personalized hot beverage prepared in view of a customer and delivered hot for optimum taste. Some embodiments allow for on demand beverage serving prepared in front of a passenger per their request, which improve customer experience through offering personalized service.

Referring now to FIGS. 1-16, an exemplary embodiment of a system (e.g., an aircraft 100) including a hot beverage dispensing mobile aircraft galley cart 102 according to the inventive concepts disclosed herein is depicted. While FIGS. 1-16 exemplarily depict the aircraft 100, some embodiments may be implemented as a mobile galley cart in any suitable vehicle (e.g., an automobile, a train, and/or a ship).

The mobile aircraft galley cart 102 may be generally rectangular cuboid-shaped. In some embodiments, the mobile aircraft galley cart 102 may be a half-size or full-size galley trolley. The mobile aircraft galley cart 102 may be configured to wheel down an aisle of the aircraft 100 and dispense hot beverages, such as espresso, coffee, and/or hot water. The mobile aircraft galley cart 102 may include at least one hot beverage maker module slot 106, at least one storage module slot 108, and at least one power module slot 110. One or more of the slots 106, 108, 110 may include rails to guide insertion of modules 104, 124, 126. At least one hot beverage maker module 104 may be inserted into the at least one hot beverage maker module slot 106 and may be removed for servicing. At least one storage module 124 may be inserted into the at least one storage module slot 108 and may be removed for servicing. At least one power module 126 may be inserted into the at least one power module slot 110 and may be removed for servicing and/or charging. The mobile aircraft galley cart 102 may include a power connector 128 configured to electrically couple the power module 126 and the hot beverage maker module 104 and to provide power from the power module 126 to the hot beverage maker module 104. The mobile aircraft galley cart 102 may include a waste water system including a removable waste water container 120 configured to receive waste water from the hot beverage maker module 104. The mobile aircraft galley cart 102 may include wheels 112, which may be located at the bottom of the mobile aircraft galley cart 102, such that, for example, the mobile aircraft galley cart 102 can be wheeled along an aisle. The mobile aircraft galley cart 102 may include at least one brake 114, which may be implemented as at least one foot pedal brake. The mobile aircraft galley cart 102 may also include a door 116, which may be closed to cover one or more of the modules 104, 124, 126 for when the mobile aircraft galley cart 102 is to be stowed in the aircraft 100.

The hot beverage maker module 104 may be configured to quickly lock in place via a lock mechanism 130 when installed in or on the mobile aircraft galley cart 102. The hot beverage maker module 104 may be installed in or on a top portion of the mobile aircraft galley cart 102. The hot beverage maker module 104 may include at least one (e.g., one or multiple) integrated hot beverage maker 118. The hot beverage maker 118 may be implemented as any suitable hot beverage maker, such as an espresso machine, a coffee maker (e.g., a standard coffee maker or a Turkish coffee maker), and/or a hot water dispenser, which may be configured to prepare and dispense a hot beverage. The hot beverage maker 118 may be configured to receive brew material 138 (e.g., espresso pods, espresso material, coffee beans, ground coffee, coffee pods, and/or K-cups). For example, the hot beverage maker 118 may include a brew unit with optimized heating technology to brew a finest cup of a hot beverage, such as espresso. The hot beverage maker 118 may include protection devices to meet airworthiness requirements. The hot beverage maker module 104 may include at least one pump 136 (e.g., to provide optimal brewing pressure), a heater 142, a water supply system 122, a waste water system, sensors, at least one of at least one of an indicator(s) or a display(s) (e.g., 132, 124), a brew volume control device, and/or a controller device 134 configured to control operation of the hot beverage maker module 104. The controller device 134 may include a printed circuit board and a controller, which may be implemented as a processor (e.g., a microprocessor). The controller device 134 may provide controlled brew parameters, such as time, temperature, volume, and pressure.

Figure 2:
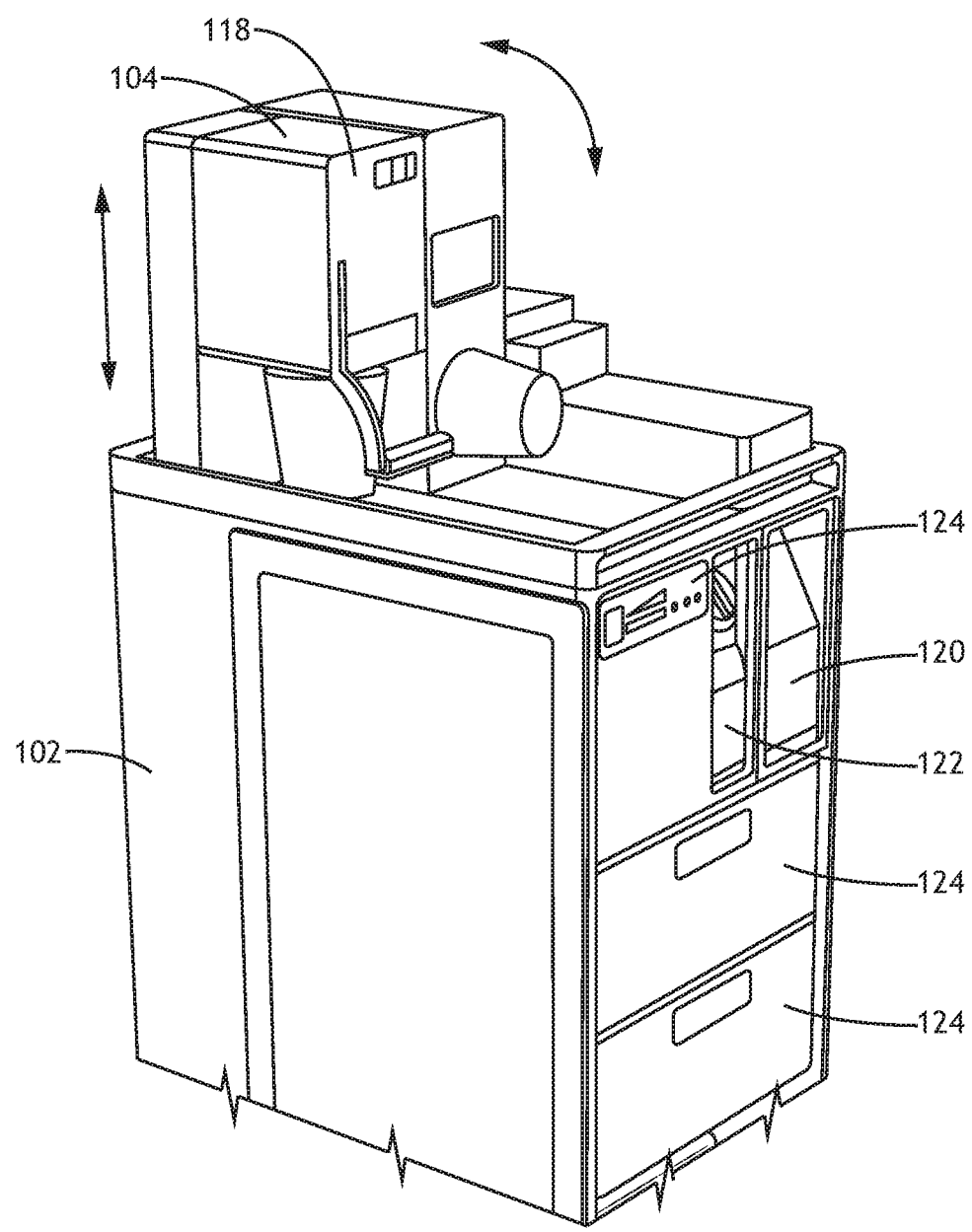
FIG. 2 is a view of a portion of the mobile aircraft galley cart of FIG. 1 according to the inventive concepts disclosed herein.
Figure 3:
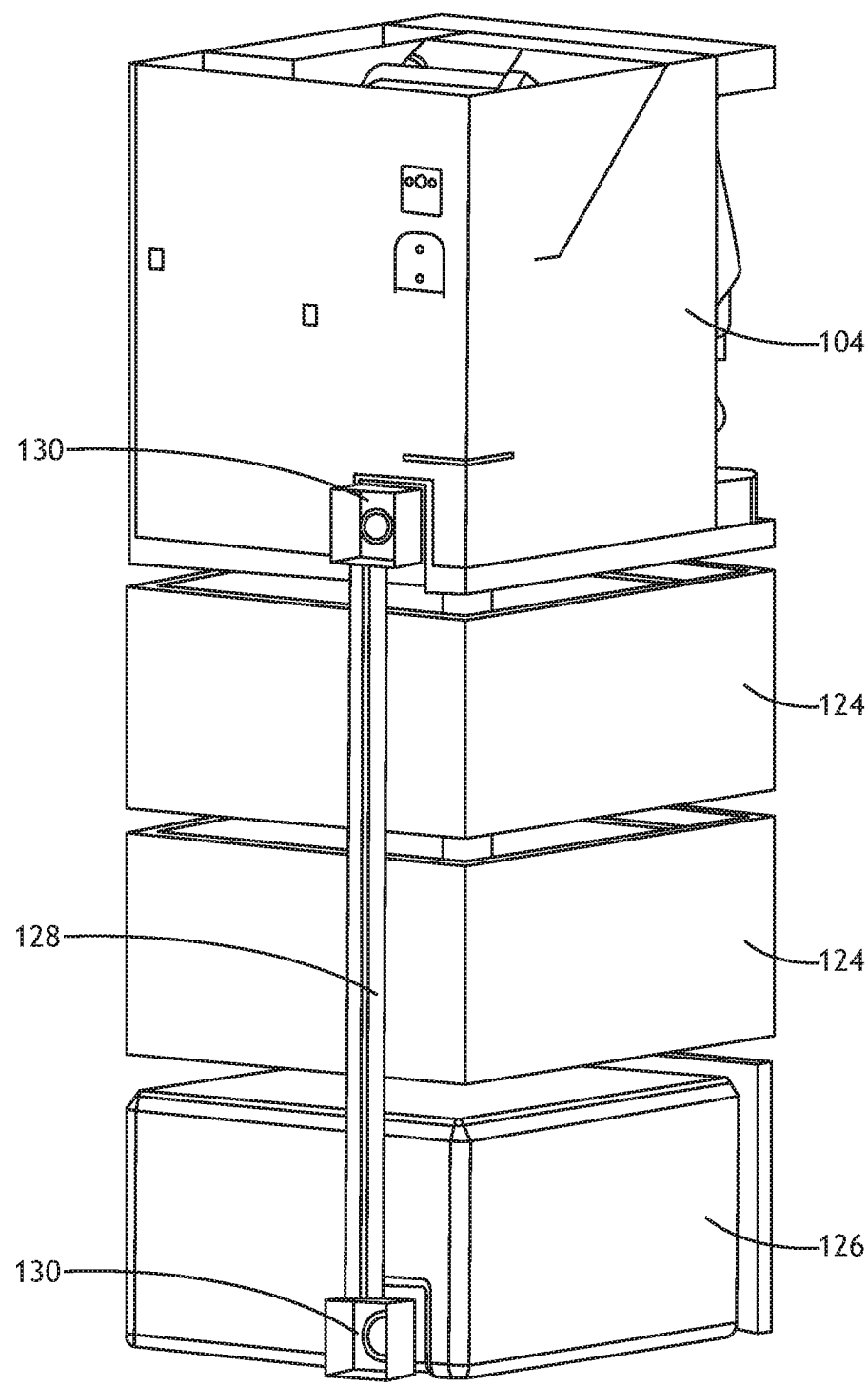
FIG. 3 is a view of a portion of the mobile aircraft galley cart of FIG. 1 according to the inventive concepts disclosed herein.
Figure 4:
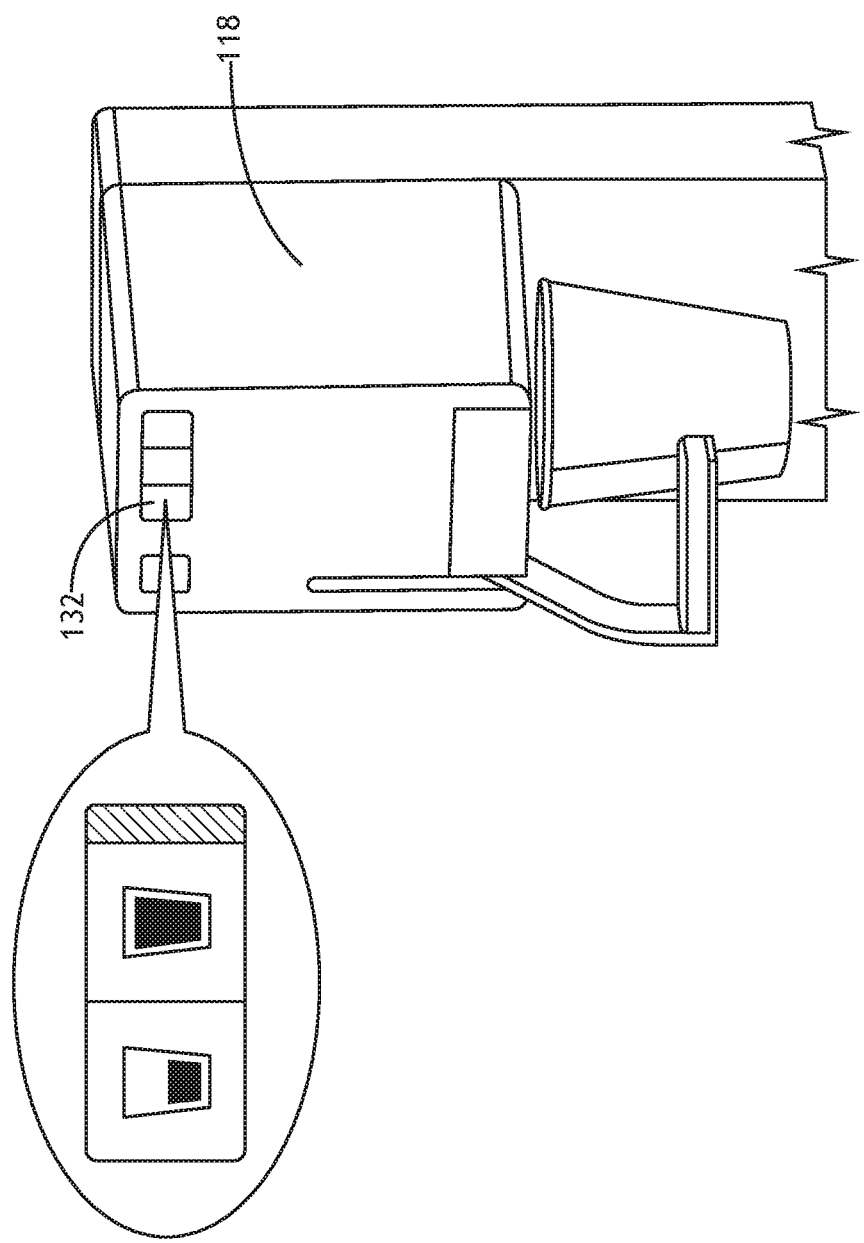
FIG. 4 is a view of a portion of the mobile aircraft galley cart of FIG. 2 according to the inventive concepts disclosed herein.
Figure 5:
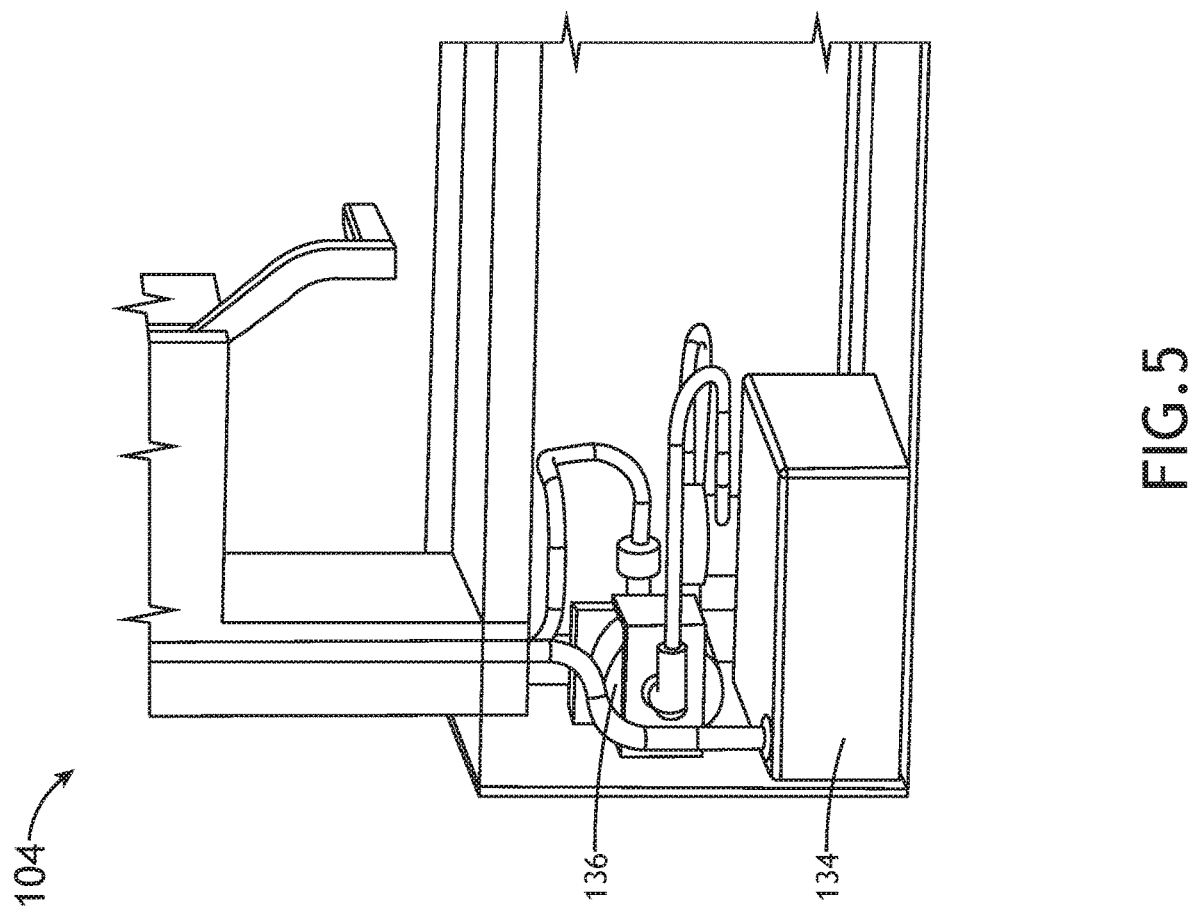
FIG. 5 is a view of a portion of the mobile aircraft galley cart of FIG. 2 according to the inventive concepts disclosed herein.

The hot beverage maker 118 may be positionable in a dispense position (e.g., as shown in FIG. 2) and a stowed position (e.g., as shown in FIG. 1). When in the dispense position, the hot beverage maker 118 may be positioned to dispense the hot beverage. When in the stowed position, the hot beverage maker module 104 may be generally rectangular cuboid-shaped. In some embodiments, the hot beverage maker 118 may be configured to rotate about an axis between the dispense position and the stowed position. In some embodiments, the hot beverage maker 118 may be configured to move linearly (e.g., up and down) between the dispense position and the stowed position. The hot beverage maker 118 may be configured to lock in place when in the dispense position and when in the stowed position, and movement between the dispense position and the stowed position may be spring-loaded.

Figure 6:
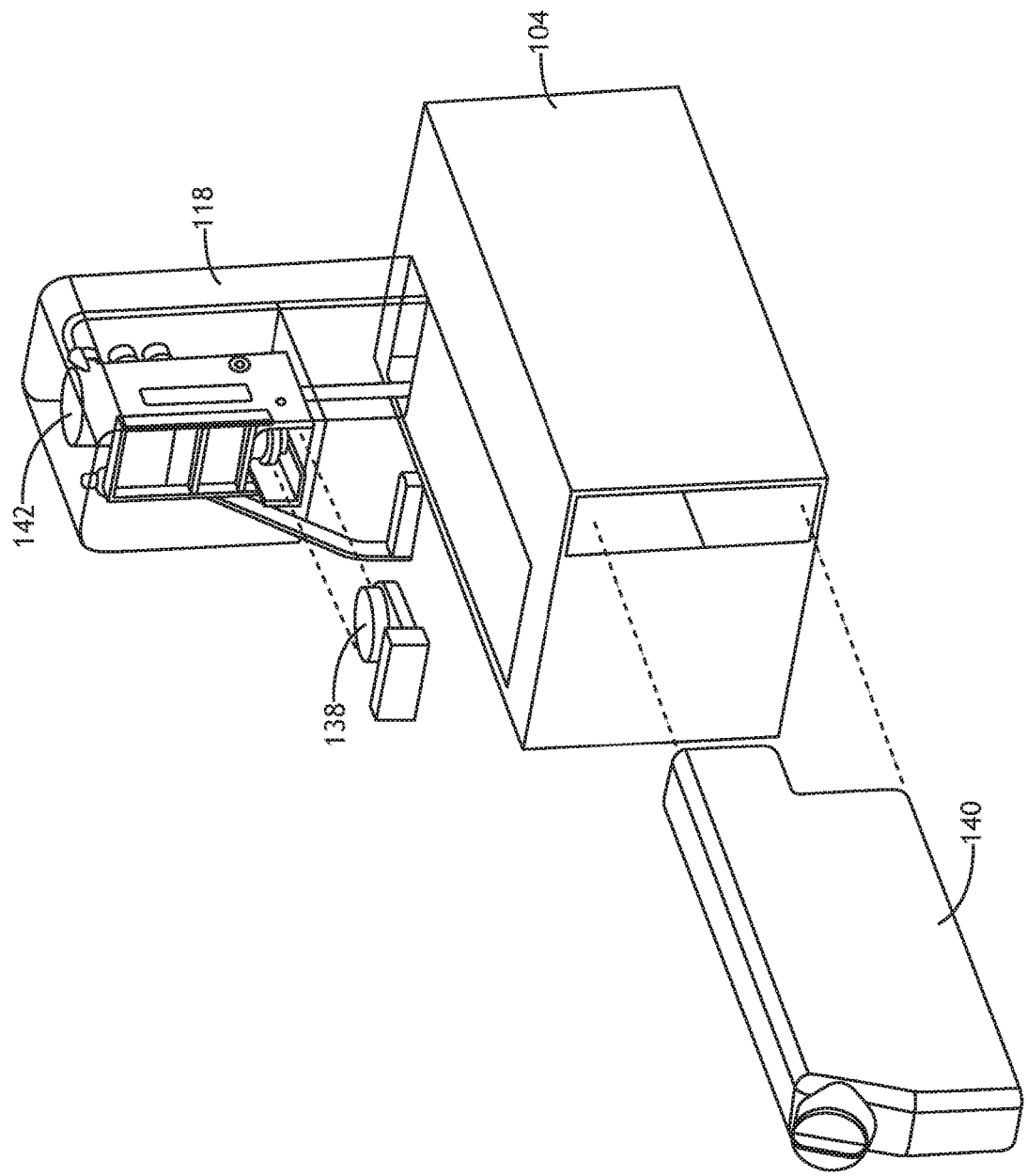
FIG. 6 is a view of a portion of the mobile aircraft galley cart of FIG. 1 according to the inventive concepts disclosed herein.

The water supply system 122 of the hot beverage maker module 104 may include a potable water container 140. The potable water container 140 may be configured to supply water to the hot beverage maker 118. The potable water container 140 may contain enough water to service one flight without refill. The potable water container 140 may be removable from the hot beverage maker module 104, as shown in FIG. 6, and replaced with another potable water container 166, which may be stored in the storage module 124.

Figure 7:
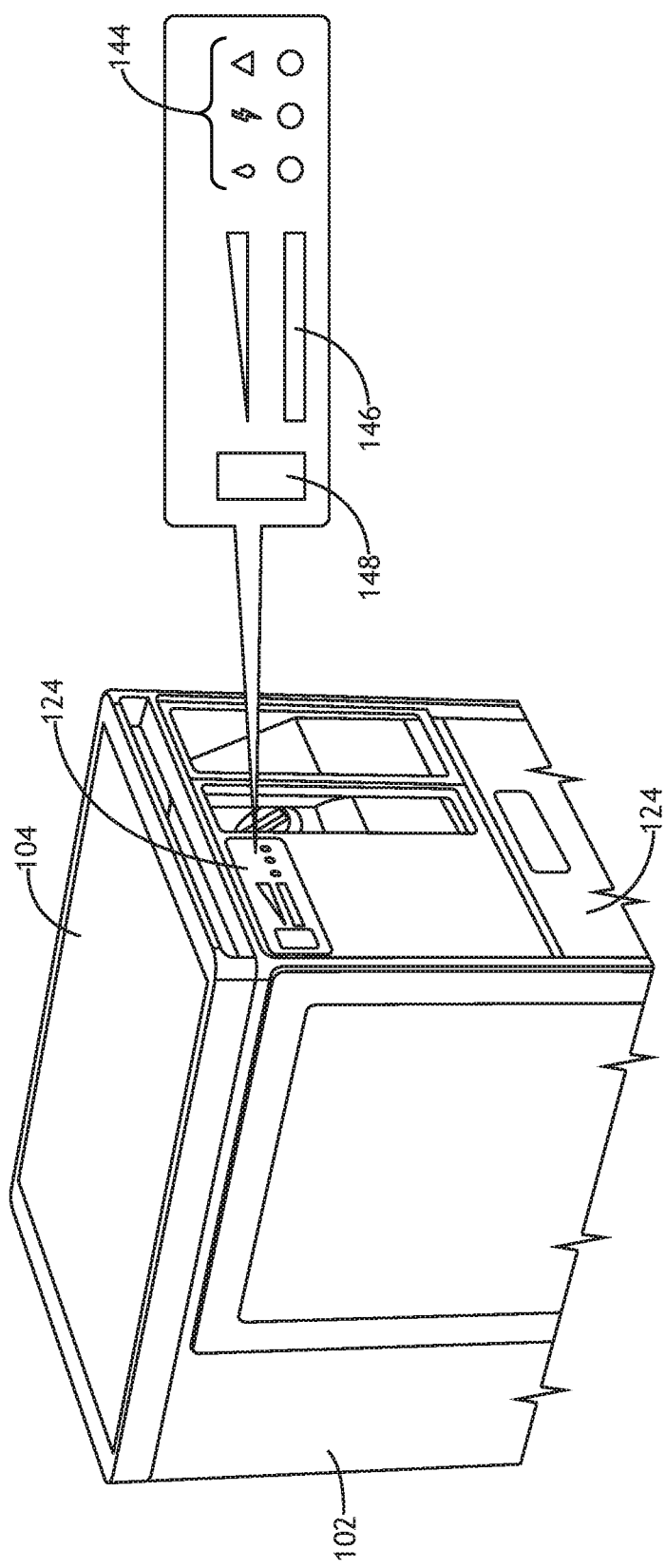
FIG. 7 is a view of a portion of the mobile aircraft galley cart of FIG. 1 according to the inventive concepts disclosed herein.
Figure 8:
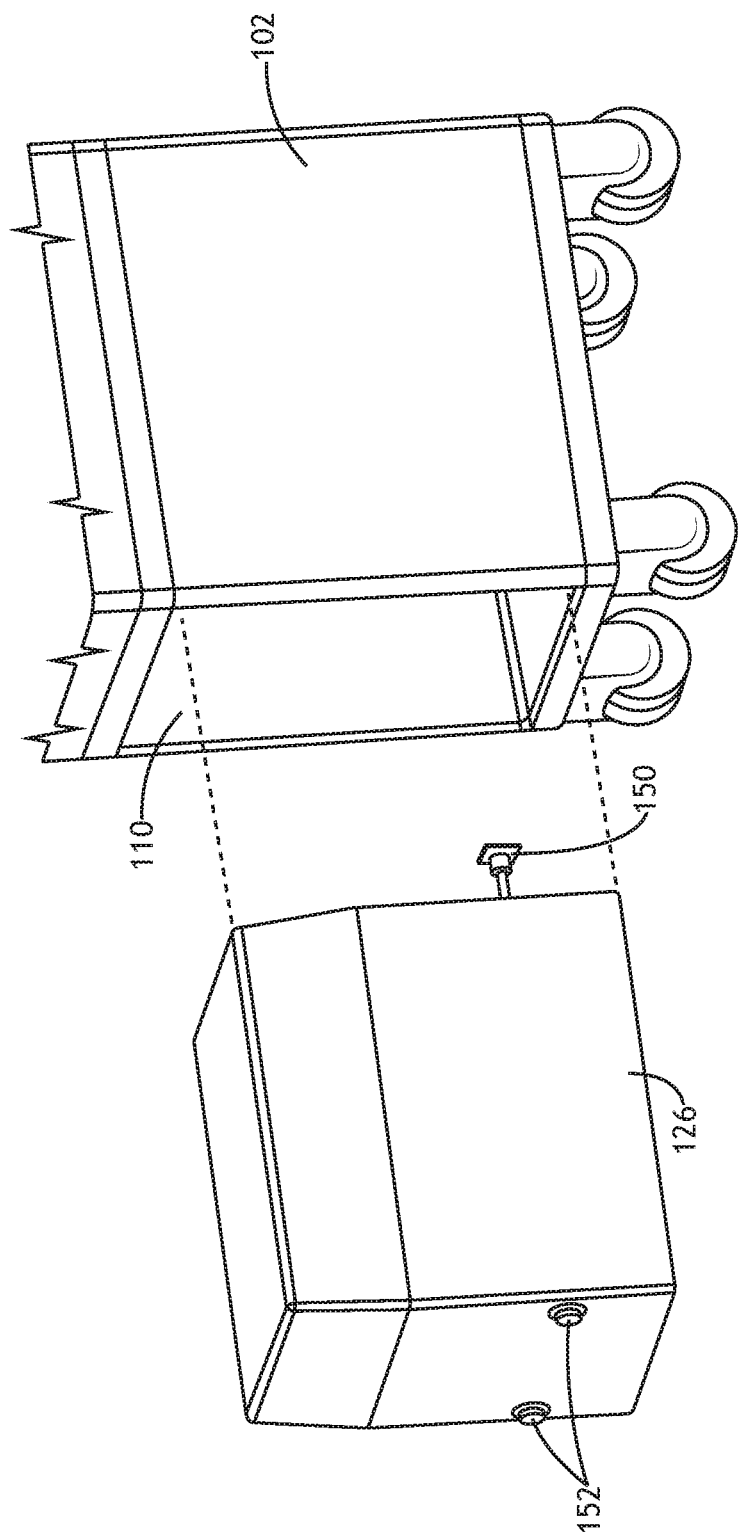
FIG. 8 is a view of a portion of the mobile aircraft galley cart of FIG. 1 according to the inventive concepts disclosed herein.
Figure 9:
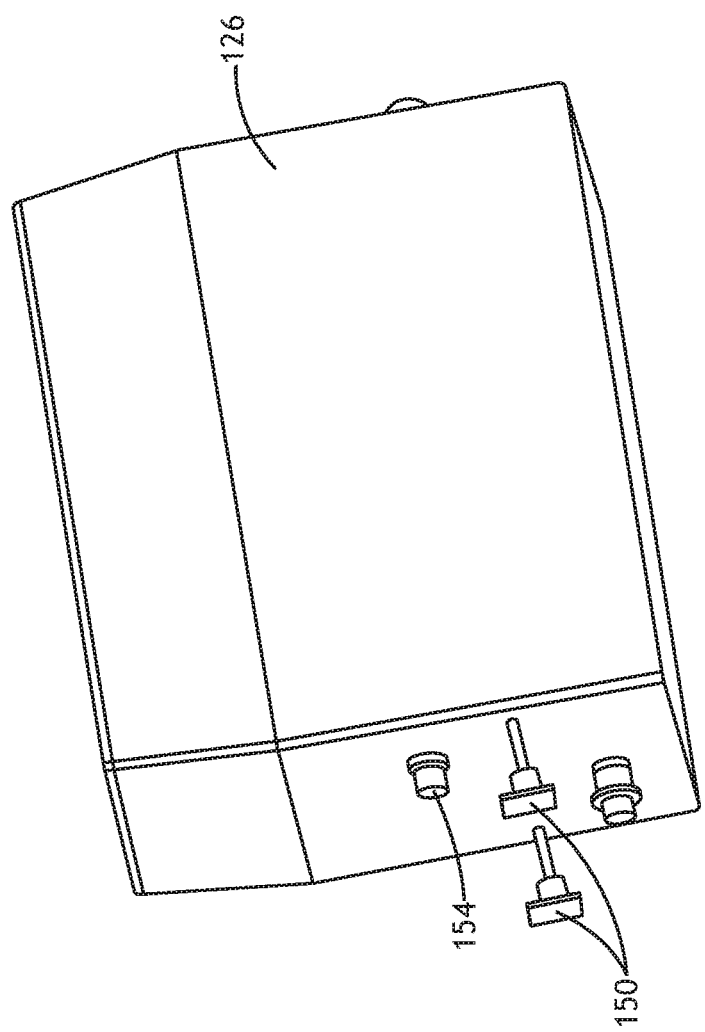
FIG. 9 is a view of a portion of the mobile aircraft galley cart of FIG. 8 according to the inventive concepts disclosed herein.
Figure 13:
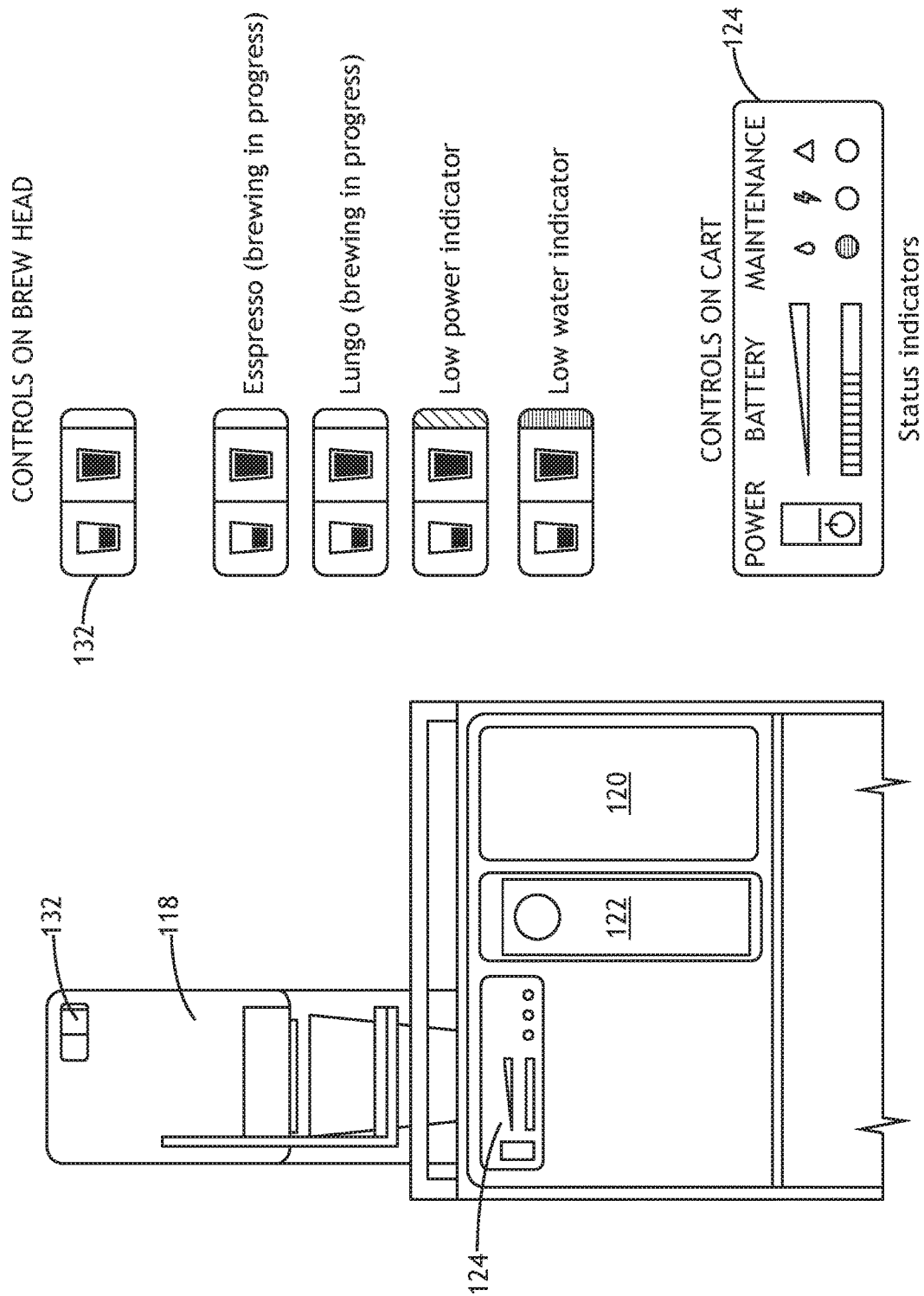
FIG. 13 is a view of a portion of the mobile aircraft galley cart of FIG. 1 according to the inventive concepts disclosed herein.
Figure 14:
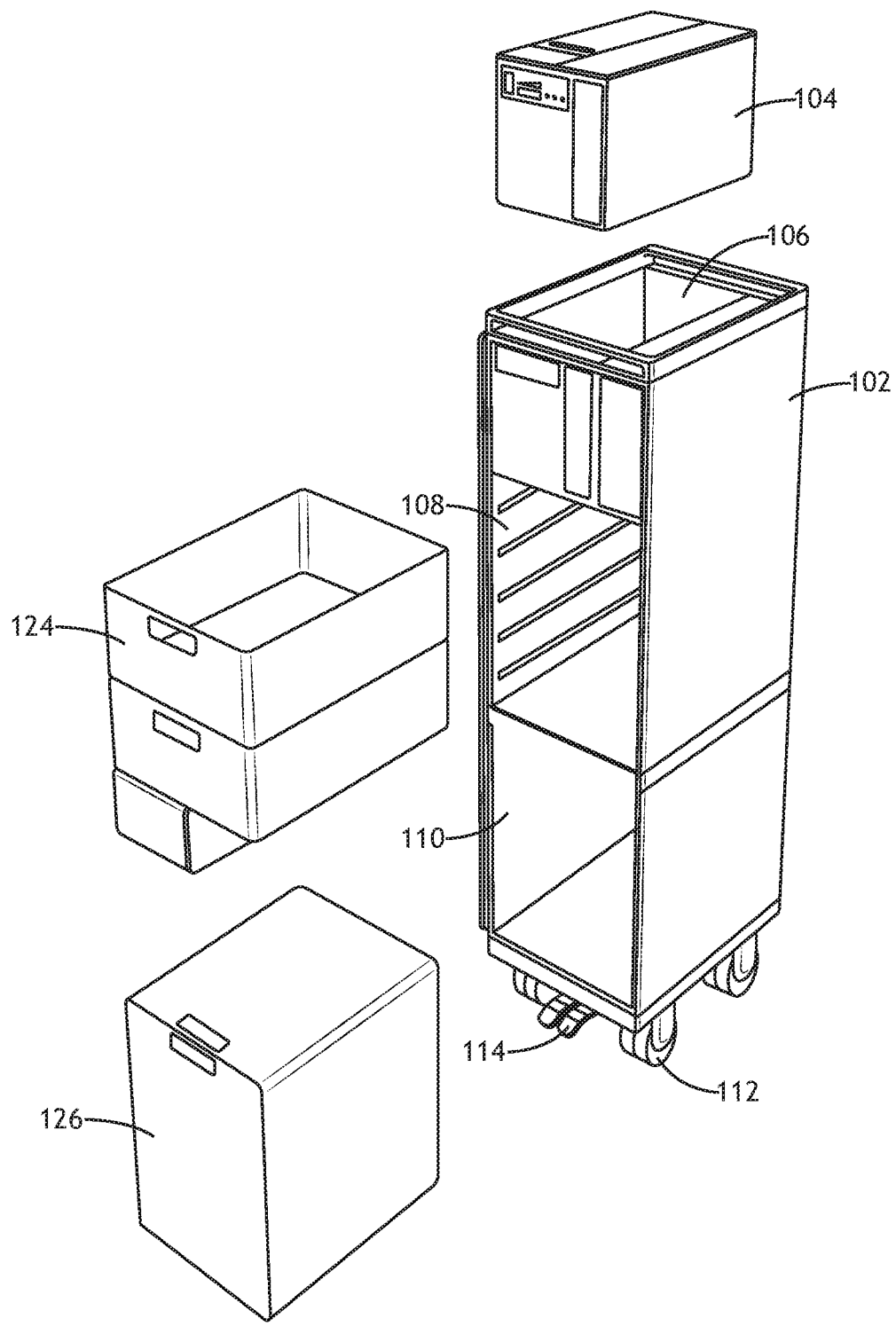
FIG. 14 is a view of a portion of the mobile aircraft galley cart of FIG. 1 according to the inventive concepts disclosed herein.
Figure 15:
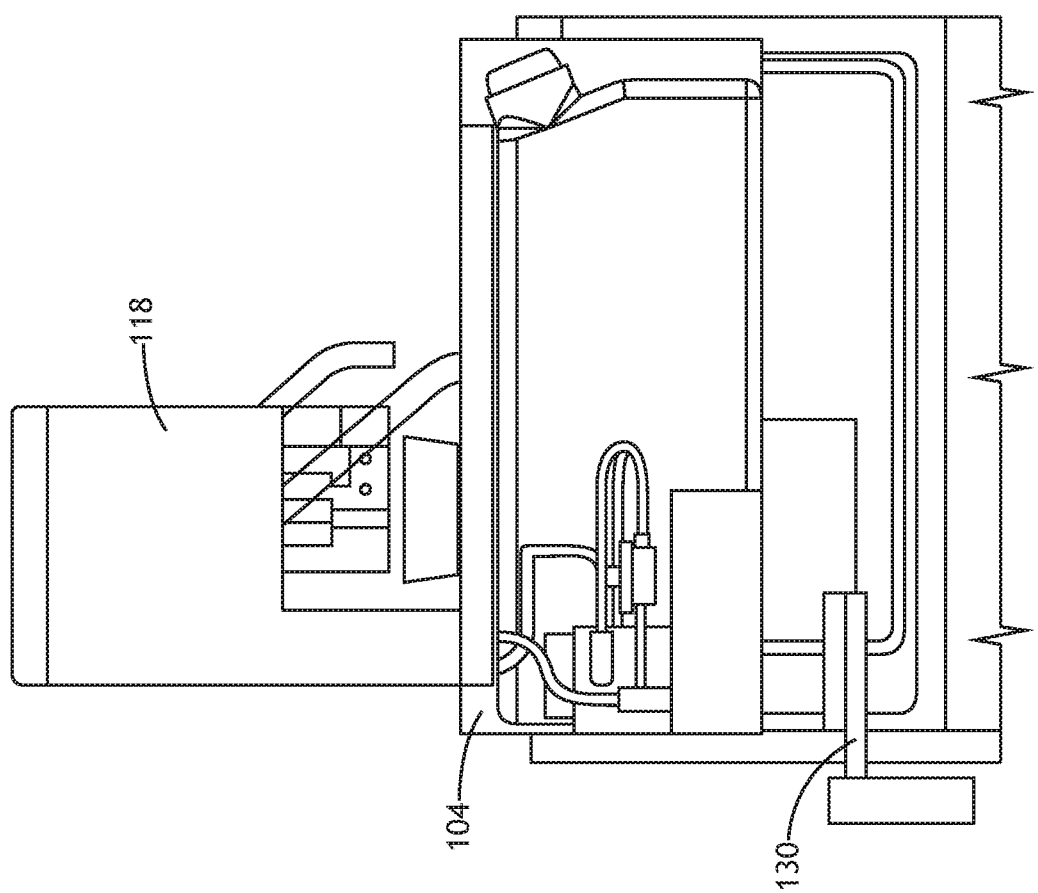
FIG. 15 is a view of a portion of the mobile aircraft galley cart of FIG. 1 according to the inventive concepts disclosed herein.
Figure 16:
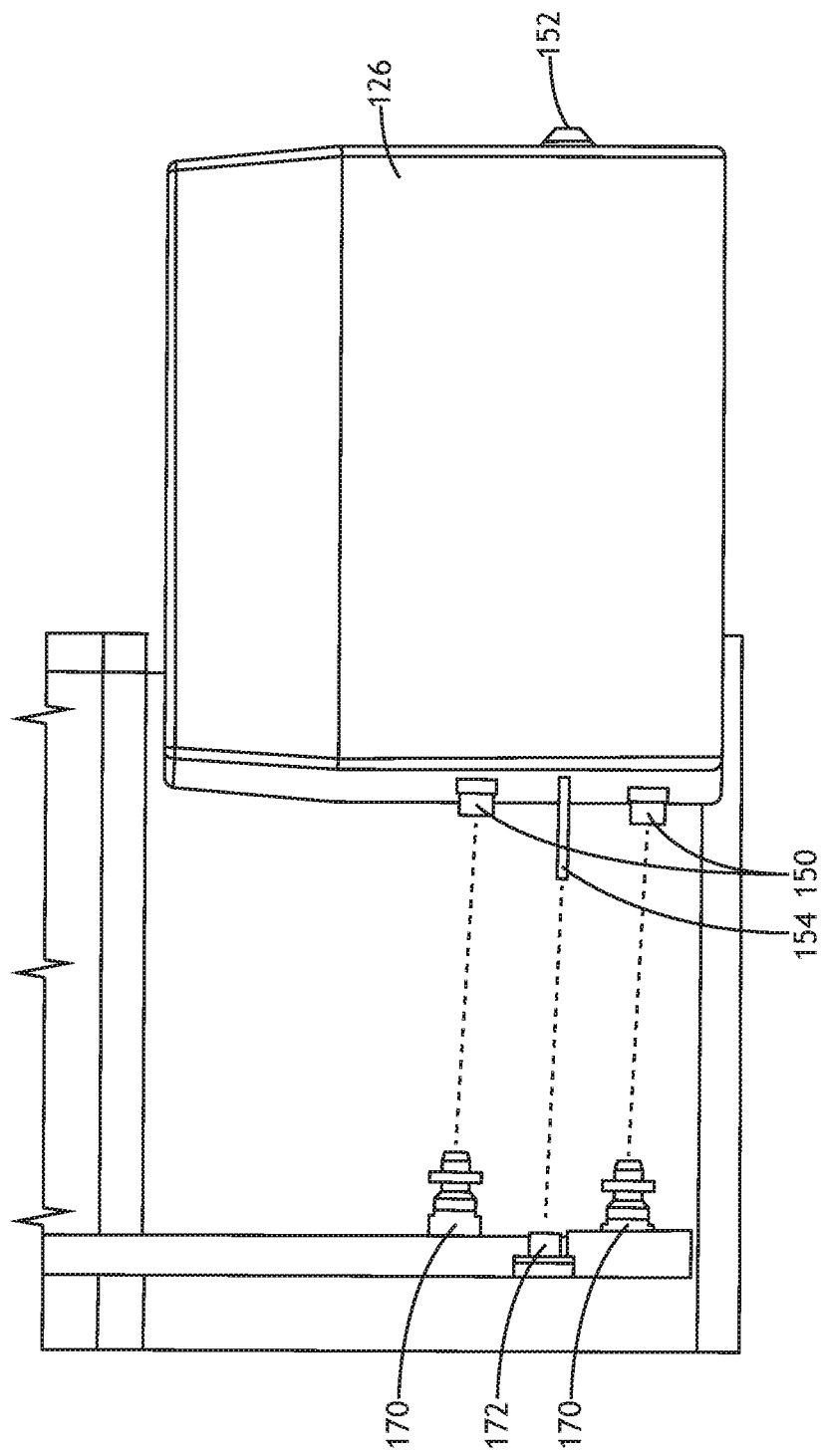
FIG. 16 is a view of a portion of the mobile aircraft galley cart of FIG. 1 according to the inventive concepts disclosed herein.

The indicator or display 124 of the hot beverage maker module 104 may include an on/off button 148, a charge indicator 146, and status indicators 144 (e.g., maintenance status indicators), for example, as shown in FIGS. 7 and 13. For example, the charge indicator 146 may be configured to indicate an amount of charge of the power module 126. The charge indicator 146 may display available energy and indicate when charge is depleted to plan power module 126 charging or replacement at a next aircraft stop.

The indicator or display 132 of the hot beverage maker 118 may include a hot beverage brewing in progress indicator (e.g., espresso brewing in progress indicator, a lungo brewing in progress indicator, and/or a coffee brewing in progress indicator), a low power indicator, and a low water indicator, for example, as shown in FIG. 13.

Figure 10:
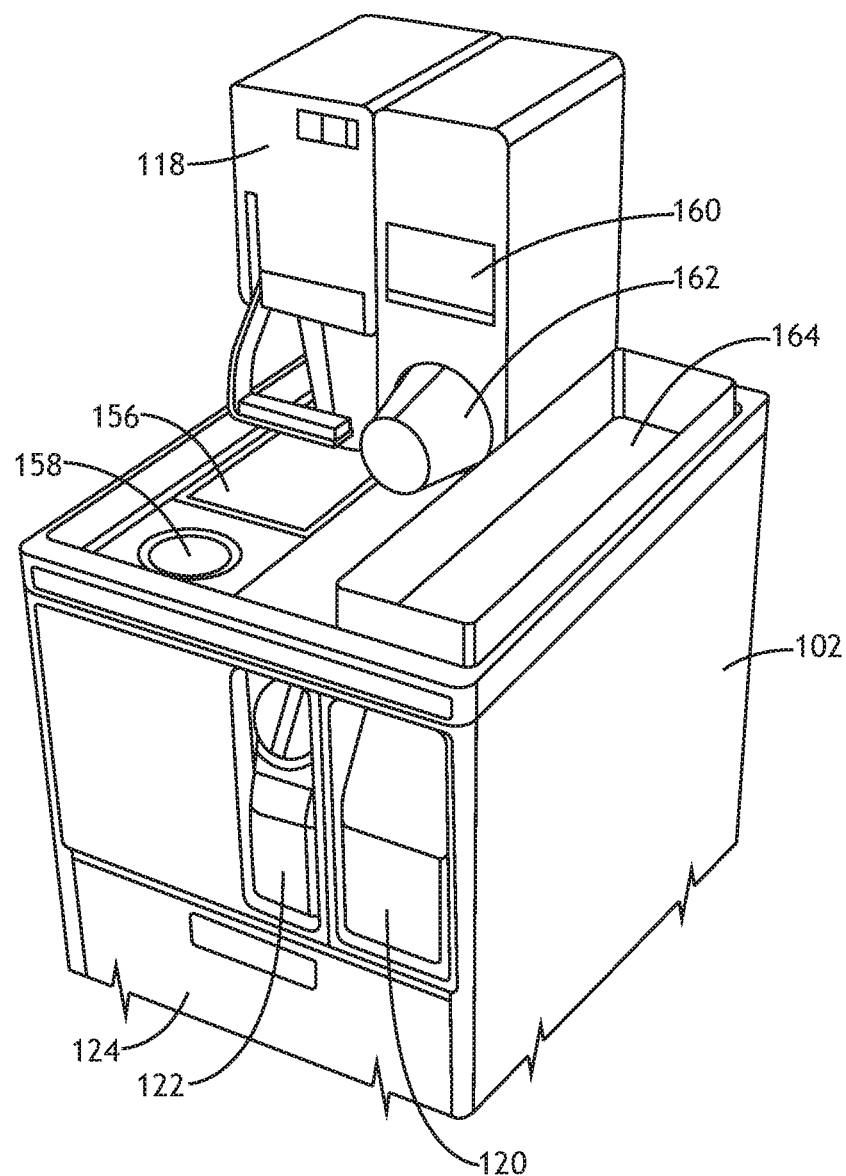
FIG. 10 is a view of a portion of the mobile aircraft galley cart of FIG. 1 according to the inventive concepts disclosed herein.
Figure 11:
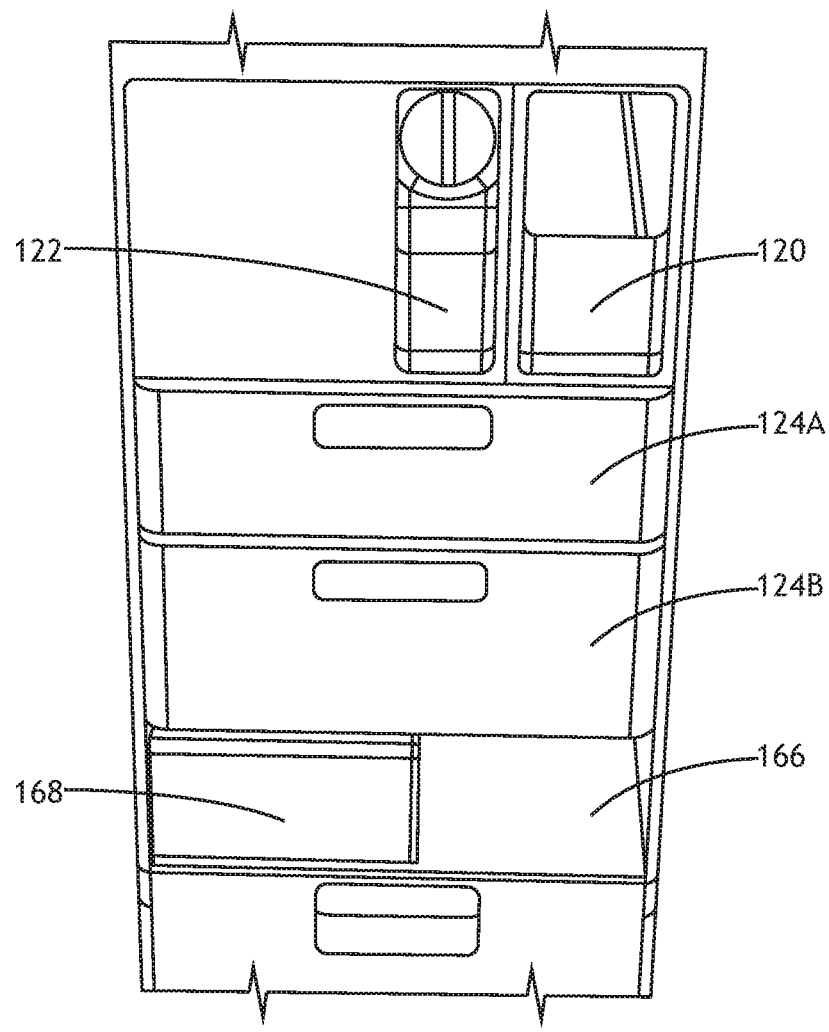
FIG. 11 is a view of a portion of the mobile aircraft galley cart of FIG. 1 according to the inventive concepts disclosed herein.
Figure 12:
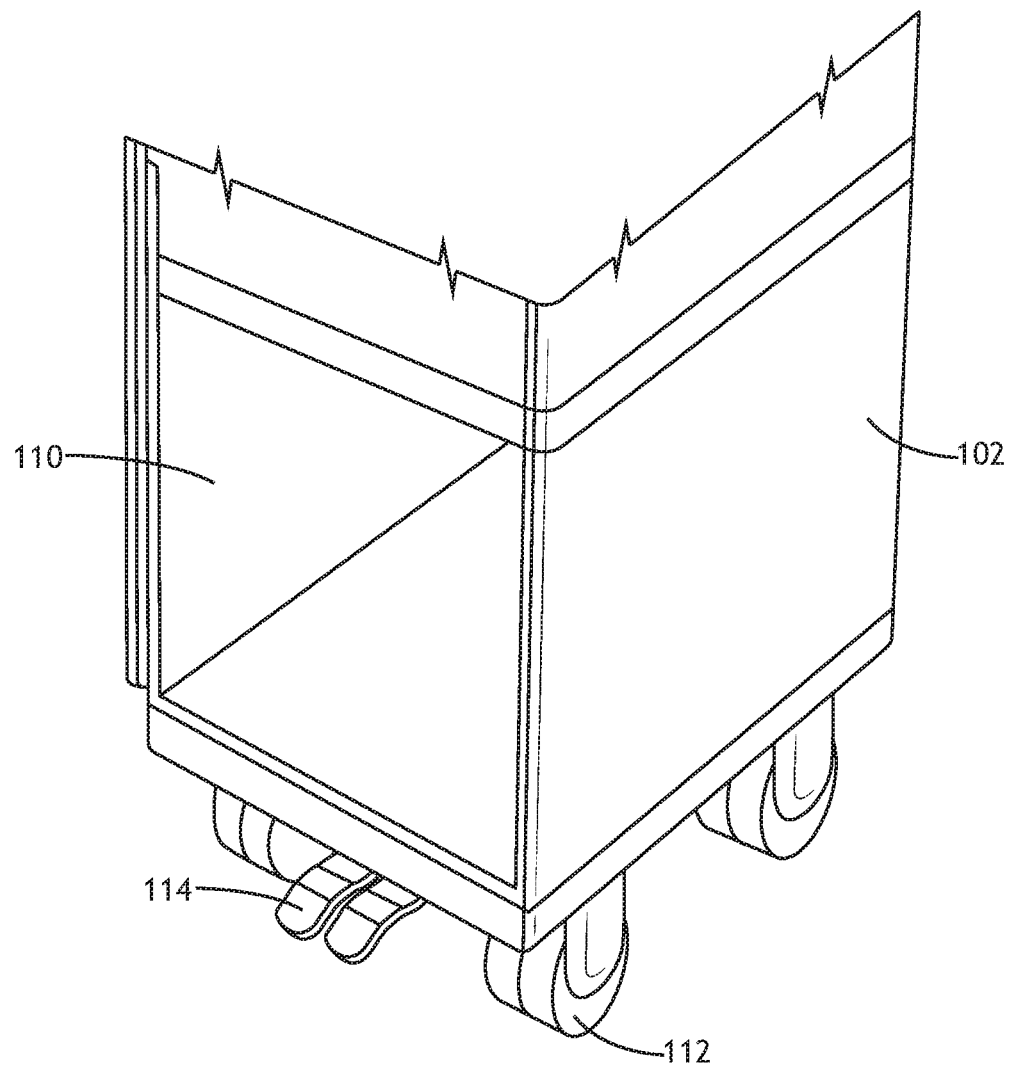
FIG. 12 is a view of a portion of the mobile aircraft galley cart of FIG. 1 according to the inventive concepts disclosed herein.

As shown in FIG. 10, the hot beverage maker module 104 may include a drip tray 156, a prep area 158, a brew material supply mechanism 160 (e.g., an easy load/unload coffee pod cup), and a cup supply 162. The hot beverage maker module 104 may be installed adjacent a condiment tray 164 of the mobile aircraft galley cart 10.

The power module 126 may be configured to quickly lock in place via one or more lock mechanisms 150, 152, 170 when installed in the power module slot 110 of the mobile aircraft galley cart 102. The power module 126 may be installed in a bottom portion of the mobile aircraft galley cart 102. The power module 126 may include a rechargeable battery, which may be "wireless" (e.g., not wired to an aircraft power supply). The power module 126 may be configured to provide power at least to the hot beverage maker module 104. The power module 126 may include a battery port 154 that may engage and/or disengage with a power connector port 172 of a connect-disconnect coupling 130 of the power connector 128. Additionally, the battery port 154 may be used to charge the battery when the power module 126 is removed from the mobile aircraft galley cart 102. The power module 126 can be easily removed and recharged off wing.

The power connector 128 may provide power between the power module 126 and the hot beverage maker module 104. The power connector 128 may include connect-disconnect couplings 130 configured to quickly engage and/or disengage with the power module 126 and the hot beverage maker module 104, respectively. The power connector 128 may be installed in a rear portion of the mobile aircraft galley cart 102 and may vertically span the rear portion of the mobile aircraft galley cart 102.

The storage module 124 may be configured to quickly lock in place via one or more lock mechanisms when installed in the storage module slot 108 of the mobile aircraft galley cart 102. The storage module 124 may be installed in a middle portion of the mobile aircraft galley cart 102 between the power module 126 and the hot beverage maker module 104. The storage module 124 may include one or more drawers 124A, 124B. The storage module 124 may store items needed to serve hot beverages and may store extra water supply. For example, the storage module 124 may store napkins, coffee pods, water bottles, etc. For example, the drawer 124A may store beverage accessories, and the drawer 124B may be a stowage drawer. Additionally, the storage module 124 may include a detachable stowage module 168 and a refill potable water container 166.

Figure 17:
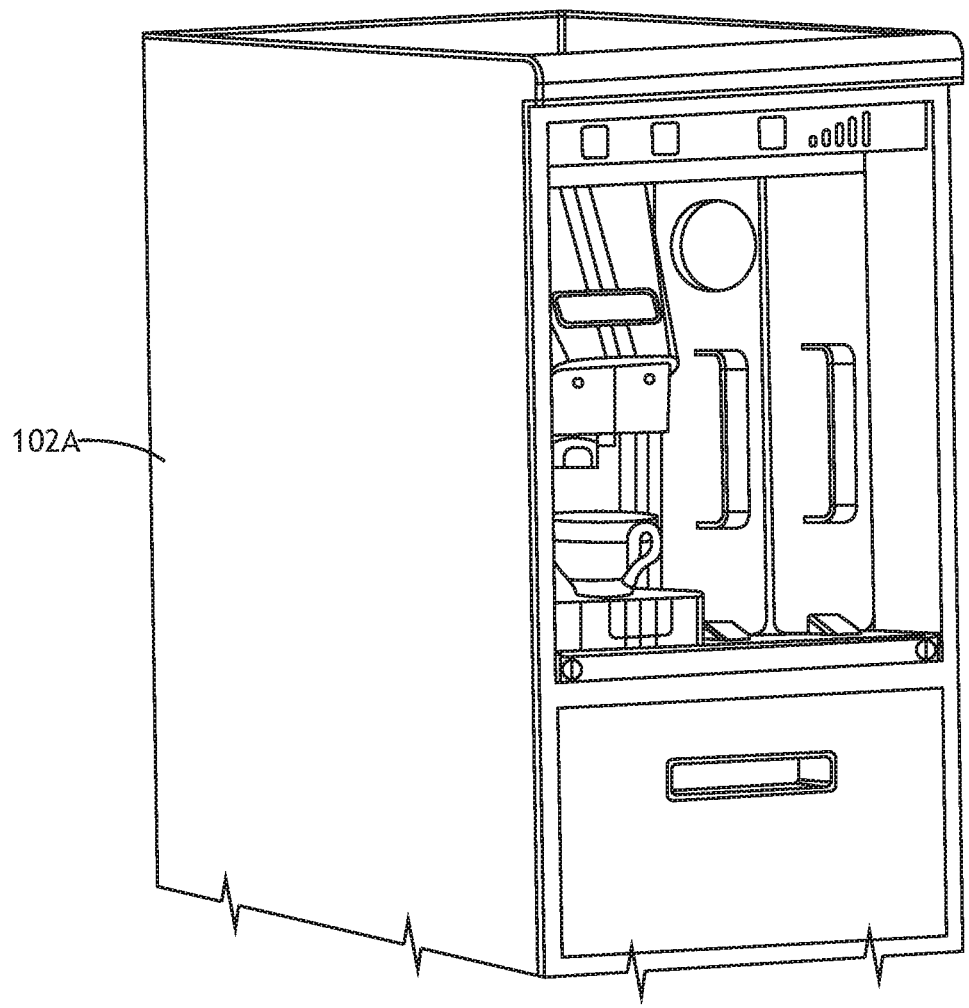
FIG. 17 is a view of a further exemplary embodiment of a hot beverage dispensing mobile aircraft galley cart according to the inventive concepts disclosed herein.

Referring now to FIG. 17, an exemplary embodiment of a hot beverage dispensing mobile aircraft galley cart 102A with a hot beverage maker module inserted into a front slot of the mobile aircraft galley cart 102A is shown.

Some embodiments may include a method according to the inventive concepts disclosed herein that may include one or more of the following steps. Additionally, for example, some embodiments may include performing one more instances of the method iteratively, concurrently, and/or sequentially.

A step may include installing a hot beverage maker module in or on a mobile aircraft galley cart, the hot beverage maker module including a hot beverage maker, the hot beverage maker module configured to prepare and dispense a hot beverage.

A step may include installing a power module in or on the mobile aircraft galley cart below the hot beverage maker module, the power module configured to provide power at least to the hot beverage maker module.

Further, the method may include any of the operations disclosed throughout.

As will be appreciated from the above, embodiments of the inventive concepts disclosed herein may be directed to system, method, and a hot beverage dispensing mobile aircraft galley cart, which may include a hot beverage maker module and a power module.

As used throughout and as would be appreciated by those skilled in the art, "at least one non-transitory computer-readable medium" may refer to as at least one non-transitory computer-readable medium (e.g., memory, storage, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A hot beverage dispensing mobile aircraft galley cart, comprising:
   a hot beverage maker module including a hot beverage maker, the hot beverage maker module implemented in or on the mobile aircraft galley cart, the hot beverage maker module configured to prepare and dispense a hot beverage; and
   a power module configured to provide power at least to the hot beverage maker module, the power module implemented in the mobile aircraft galley cart;
   wherein, when the hot beverage maker module is installed in or on the mobile aircraft galley cart, the hot beverage maker is positionable in one of a dispense position and a stowed position at a given time, wherein when in the dispense position, the hot beverage maker is positioned to dispense the hot beverage.

2. The hot beverage dispensing mobile aircraft galley cart of claim 1, wherein the hot beverage maker module is removable from a hot beverage maker module slot of the mobile aircraft galley cart.

3. The hot beverage dispensing mobile aircraft galley cart of claim 2, wherein the hot beverage maker module is configured to lock in place when installed in or on the mobile aircraft galley cart.

4. The hot beverage dispensing mobile aircraft galley cart of claim 1, wherein the hot beverage maker is configured to rotate about an axis between the dispense position and the stowed position.

5. The hot beverage dispensing mobile aircraft galley cart of claim 1, wherein the hot beverage maker is configured to move linearly between the dispense position and the stowed position.

6. The hot beverage dispensing mobile aircraft galley cart of claim 1, wherein the hot beverage maker is configured to lock in place when in the dispense position and when in the stowed position.

7. The hot beverage dispensing mobile aircraft galley cart of claim 1, wherein the power module is removable from a power module slot of the mobile aircraft galley cart, wherein the power module is rechargeable and not wired to an aircraft power supply when installed in the hot beverage dispensing mobile aircraft galley cart.

8. The hot beverage dispensing mobile aircraft galley cart of claim 7, wherein the power module is configured to lock in place when installed in or on the mobile aircraft galley cart.

9. The hot beverage dispensing mobile aircraft galley cart of claim 1, further comprising a power connector configured to electrically couple the power module and the hot beverage maker module.

10. The hot beverage dispensing mobile aircraft galley cart of claim 9, wherein the power connector includes connect-disconnect couplings configured to connect and disconnect from the power module and the hot beverage maker module.

11. The hot beverage dispensing mobile aircraft galley cart of claim 1, further comprising a water supply system installed in or on the mobile aircraft galley cart, the water supply system comprising a potable water container.

12. The hot beverage dispensing mobile aircraft galley cart of claim 1, further comprising a waste water system installed in or on the mobile aircraft galley cart, the waste water system comprising a waste water container.

13. The hot beverage dispensing mobile aircraft galley cart of claim 1, further comprising a storage module inserted into a storage module slot of the mobile aircraft galley cart.

14. The hot beverage dispensing mobile aircraft galley cart of claim 13, wherein the storage module is positioned between the power module and the hot beverage maker module.

15. The hot beverage dispensing mobile aircraft galley cart of claim 1, further comprising wheels installed at a bottom of the mobile aircraft galley cart and at least one brake installed on the mobile aircraft galley cart.

16. The hot beverage dispensing mobile aircraft galley cart of claim 1, wherein the hot beverage maker module includes at least one of an indicator or a display.

17. The hot beverage dispensing mobile aircraft galley cart of claim 16, wherein the at least one of the indicator or the display is configured to indicate an amount of charge of the power module.

18. An aircraft, comprising:
   a hot beverage dispensing mobile aircraft galley cart, comprising:
      a hot beverage maker module including a hot beverage maker, the hot beverage maker module implemented in or on the mobile aircraft galley cart, the hot beverage maker module configured to prepare and dispense a hot beverage; and a power module configured to provide power at least to the hot beverage maker module, the power module implemented in the mobile aircraft galley cart below the hot beverage maker module, wherein, when the hot beverage maker module is installed in or on the mobile aircraft galley cart, the hot beverage maker is positionable in one of a dispense position and a stowed position at a given time, wherein when in the dispense position, the hot beverage maker is positioned to dispense the hot beverage, wherein movement between the dispense position and the stowed position is spring-loaded.

19. A method, comprising:

installing a hot beverage maker module in or on a mobile aircraft galley cart, the hot beverage maker module including a hot beverage maker, the hot beverage maker module configured to prepare and dispense a hot beverage; and installing a power module in or on the mobile aircraft galley cart below the hot beverage maker module, the power module configured to provide power at least to the hot beverage maker module, wherein, when the hot beverage maker module is installed in or on the mobile aircraft galley cart, the hot beverage maker is positionable in one of a dispense position and a stowed position at a given time, wherein when in the dispense position, the hot beverage maker is positioned to dispense the hot beverage.

20. The hot beverage dispensing mobile aircraft galley cart of claim 1, wherein movement between the dispense position and the stowed position is spring-loaded.

* * * * *